(12) United States Patent
Zimmer et al.

(10) Patent No.: US 9,739,395 B2
(45) Date of Patent: Aug. 22, 2017

(54) GRID VALVE APPARATUS

(71) Applicant: Dresser-Rand Company, Olean, NY (US)

(72) Inventors: Luke P. Zimmer, Pomfret, CT (US); Alan LePain, Holden, MA (US); Fred Woehr, Worcester, MA (US)

(73) Assignee: Dresser-Rand Company, Olean, NY (US)

(*) Notice: Subject to any disclaimer, the term of this patent is extended or adjusted under 35 U.S.C. 154(b) by 22 days.

(21) Appl. No.: 14/560,325

(22) Filed: Dec. 4, 2014

(65) Prior Publication Data

US 2015/0204455 A1 Jul. 23, 2015

Related U.S. Application Data

(60) Provisional application No. 61/925,357, filed on Jan. 9, 2014.

(51) Int. Cl.
| | |
|---|---|
| *F16K 31/08* | (2006.01) |
| *F01D 17/14* | (2006.01) |
| *F16K 3/08* | (2006.01) |

(52) U.S. Cl.
CPC ............ *F16K 31/08* (2013.01); *F01D 17/145* (2013.01); *F16K 3/085* (2013.01); *F16K 31/088* (2013.01); *F01D 17/148* (2013.01); *F05D 2220/31* (2013.01)

(58) Field of Classification Search
CPC ......... F16K 31/08; F16K 31/088; F16K 3/085
See application file for complete search history.

(56) References Cited

U.S. PATENT DOCUMENTS

| | | | | |
|---|---|---|---|---|
| 5,131,170 A | * | 7/1992 | Rilke | F26B 5/06 137/625.31 |
| 5,334,898 A | * | 8/1994 | Skybyk | H02K 3/46 310/114 |
| 5,417,083 A | * | 5/1995 | Eber | F16K 3/085 251/129.11 |
| 6,192,922 B1 | * | 2/2001 | MacGibbon | F16K 3/085 137/486 |
| 6,378,556 B1 | * | 4/2002 | Fondse | F16K 11/0655 137/597 |
| 6,789,573 B2 | * | 9/2004 | Knapp | F16K 11/0743 137/315.15 |
| 7,284,571 B2 | * | 10/2007 | Ozawa | F16K 31/042 137/625.46 |
| 2012/0132836 A1 | * | 5/2012 | Cadeau | F23N 1/007 251/65 |

* cited by examiner

*Primary Examiner* — Michael R Reid
*Assistant Examiner* — Patrick Williams (57) ABSTRACT

A grid valve may include an annular stationary plate having a first annular surface, and an annular rotatable plate disposed on the annular stationary plate and rotatable relative to the annular stationary plate. The annular rotatable plate may have a second annular surface, and each of the annular stationary plate and the annular rotatable plate may define a plurality of holes in the respective annular surfaces thereof. The grid valve may further include a first magnet disposed on the first annular surface and a second magnet disposed on the second annular surface such that the first magnet repels the second magnet.

20 Claims, 6 Drawing Sheets

GRID VALVE APPARATUS

CROSS REFERENCE TO RELATED APPLICATIONS

This application claims the benefit of U.S. Provisional Patent Application having Ser. No. 61/925,357, which was filed Jan. 9, 2014. The aforementioned patent application is hereby incorporated by reference in its entirety into the present application to the extent consistent with the present application.

BACKGROUND

For industrial applications, multi-stage steam turbines are often designed to extract working fluid, e.g., steam, at definite pressures from one or more intermediate stages of the multi-stage steam turbine as the steam travels from an inlet to an outlet of the multi-stage steam turbine. As the steam travels from the inlet to the outlet, the pressure of the steam may drop (e.g., successively in each stage) while the steam gradually expands. Thus, steam extracted from an intermediate stage may have a pressure less than the pressure of the steam at the inlet and greater than the pressure of the steam at the outlet.

One way of extracting steam of a desired pressure is to let the steam "bleed" out from an intermediate stage via an opening. While this is a relatively simple way of obtaining steam of a desired pressure, the pressure of the extracted steam may not be stable, e.g., may vary based on load conditions of the steam turbine, and thus steam having a relatively fixed pressure may not be obtained.

To overcome the above drawback, the multi-stage steam turbine may include a grid valve between intermediate stages. Herein, to obtain steam having a relatively fixed pressure, the grid valve of an intermediate stage having steam of the desired pressure may be closed to hold the steam therein and prevent the steam from passing to the downstream stages. The desired fixed pressure steam may then be extracted from the intermediate stage.

Figure 1:
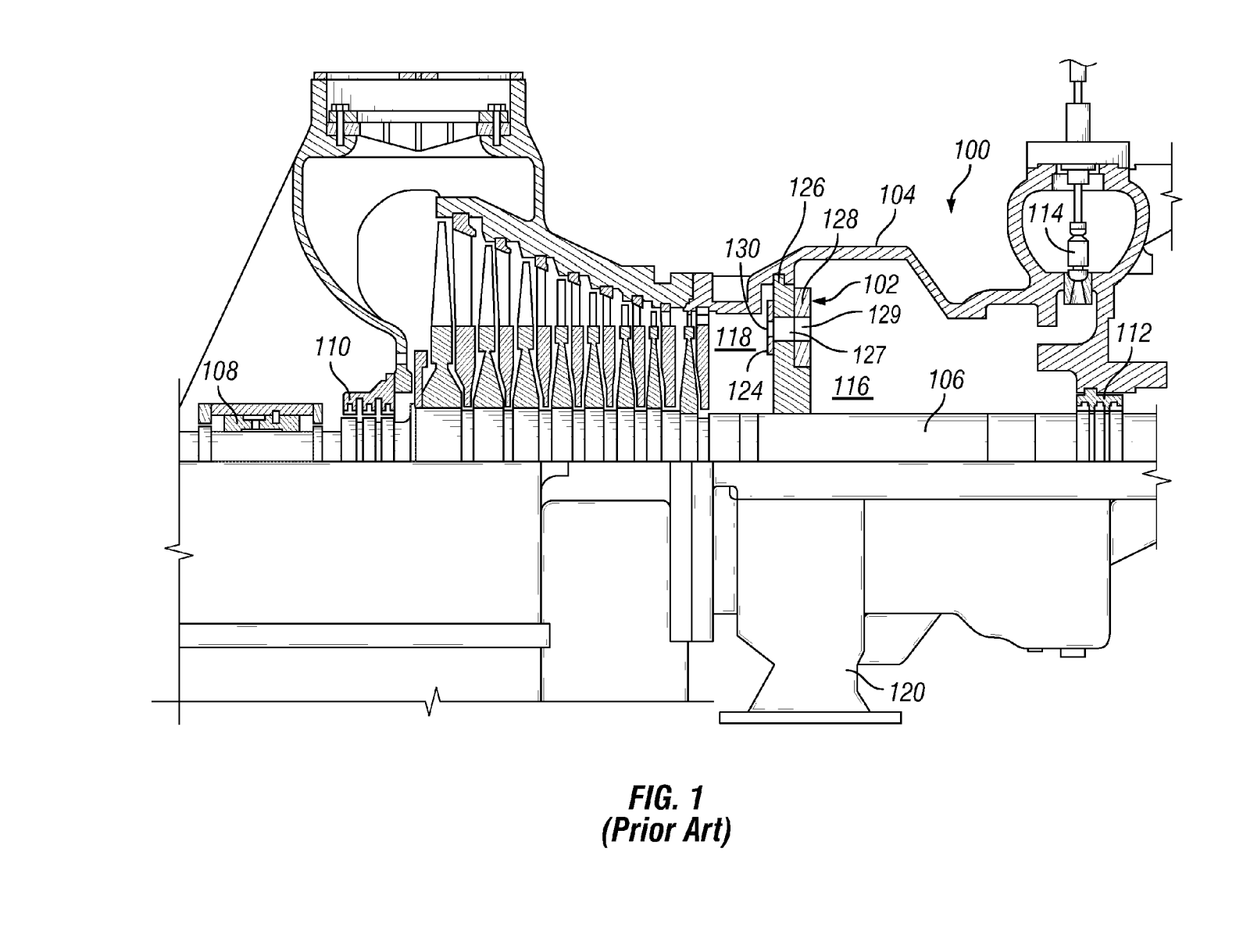
FIG. 1 illustrates a cross-sectional overview of a conventional steam turbine including a conventional annular grid valve.

FIG. 1 illustrates a cross-sectional overview of a conventional multi-stage steam turbine 100 (only 2 stages shown) including a conventional annular grid valve 102. The conventional multi-stage steam turbine 100 may include a casing 104 having a rotatable shaft 106 mounted therein on suitable bearings 108 (only one of which is shown). Suitable seals 110 and 112, e.g., labyrinth seals, may be provided around the rotatable shaft 106. High pressure steam may be admitted into the casing 104 through an inlet valve 114.

The steam may flow into a relatively high pressure stage 116, wherein the steam may have a high pressure. The high pressure stage 116 may be separated from a relatively low pressure stage 118 (wherein the steam may have a low pressure relative to the high pressure stage 116) by the conventional annular grid valve 102 disposed about the rotatable shaft 106.

Typically, the conventional annular grid valve 102 may include an annular stationary plate 126 and an annular rotatable plate 128 disposed on the annular stationary plate 126 and rotatable relative to the annular stationary plate 126. The annular stationary plate 126 may define a plurality of stationary plate holes 127 circumferentially disposed therein. Likewise, the annular rotatable plate 128 may also define a plurality of rotatable plate holes 129 circumferentially disposed therein.

The annular grid valve 102 may be "opened" by rotating the annular rotatable plate 128 such that the stationary plate holes 127 and the rotatable plate holes 129 overlap each other to create a passageway for steam to pass through the annular grid valve 102 from the upstream high pressure stage 116 to the downstream low pressure stage 118. Similarly, the annular grid valve 102 may be "closed" by rotating the annular rotatable plate 128 such that the stationary plate holes 127 and the rotatable plate holes 129 do not overlap one another. When closed, steam may be prevented from passing to the downstream low pressure stage 118 and at least a portion of the steam may be extracted from the high pressure stage 116 via an extraction conduit 120.

The steam traversing the annular grid valve 102 may pass through an annular nozzle plate 124 that may be disposed on and in contact with the annular stationary plate 126 in the low pressure stage 118. The annular nozzle plate 124 may define a plurality of evenly spaced, circumferentially disposed nozzles 130. The nozzles 130 may be arranged in groups and it may be desired to provide steam to the low pressure stage 118 sequentially (one group after the other) via the groups of nozzles 130.

However, in the conventional annular grid valve 102, the stationary plate holes 127 and the rotatable plate holes 129 may overlap with each other at the same time and by the same amount (e.g., size of the passageway created due to the overlap is the same). Also, all stationary plate holes 127 may be closed the same time. Because all stationary plate holes 127 and all rotatable plate holes 129 may overlap at the same time and by the same amount, steam exiting the high pressure stage 116 may pass through all the nozzles 130 at the same time and it may thus not be possible to provide steam to the low pressure stage 118 sequentially via the nozzles 130. Also, steam entering the low pressure stage 118 in such a manner may have a throttling effect on the low pressure stage 118 which may lead to decreased efficiency of the conventional multi-stage steam turbine 100.

Additionally, the steam acting on the annular rotatable plate 128 may create a force on the respective annular mating surfaces (not shown) of the annular stationary plate 126 and the annular rotatable plate 128. This force may be a function of the differential pressure across the annular grid valve 102 and the area of the annular surface of the annular rotatable plate 128 exposed to the steam. As the differential pressure and the surface area of the annular rotatable plate 128 exposed to the steam increase, the force on the annular mating surfaces may increase and an increased actuating force may be utilized to rotate the annular rotatable plate 128. In order to provide an increased actuating force, an actuating mechanism(s) having an increased output, for example, providing an increased mechanical force, may be utilized.

What is needed, then, is a grid valve that may provide steam to a downstream stage sequentially via the nozzles, thereby reducing the throttling effect, and which may be actuated with a reduced actuating force under an increased differential pressure and exposed plate area.

SUMMARY

Example embodiments of the disclosure provide a grid valve. The grid valve may include an annular stationary plate having a first annular surface, and an annular rotatable plate disposed on the annular stationary plate and rotatable relative to the annular stationary plate. The annular rotatable plate may have a second annular surface, and each of the annular stationary plate and the annular rotatable plate may define a plurality of holes in the respective annular surfaces thereof. The grid valve may further include a first magnet disposed on the first annular surface and a second magnet disposed on the second annular surface such that the first magnet repels the second magnet.

Example embodiments of the disclosure may further provide a grid valve. The grid valve may include an annular stationary plate defining a plurality of stationary plate holes in a first annular surface thereof, and an annular rotatable plate disposed on the annular stationary plate and rotatable relative to the annular stationary plate. The annular rotatable plate may define a plurality of rotatable plate holes in a second annular surface thereof. The plurality of rotatable plate holes may include a first set of rotatable plate holes and a second set of rotatable plate holes. The first set of rotatable plate holes may have a first circumferential extent and the second set of rotatable plate holes may have a second circumferential extent different from the first circumferential extent. The annular rotatable plate may be configured to permit working fluid to pass through the plurality of stationary plate holes and the plurality of rotatable plate holes in a first predetermined sequence.

Example embodiments of the disclosure may still further provide a grid valve. The grid valve may include an annular stationary plate defining a plurality of stationary plate holes on a first annular surface thereof, and an annular rotatable plate disposed on the annular stationary plate and rotatable relative to the annular stationary plate. The annular rotatable plate may define a plurality of rotatable plate holes on a second annular surface thereof. The plurality of rotatable plate holes may include a first set of rotatable plate holes and a second set of rotatable plate holes. The first set of rotatable plate holes may have a first circumferential extent and the second set of rotatable plate holes may have a second circumferential extent different from the first circumferential extent. The annular rotatable plate may be configured to permit working fluid to axially pass through a first group of the plurality of stationary plate holes and a second group of the plurality of stationary plate holes in a first predetermined sequence. The grid valve may further include a first magnet disposed on the first annular surface and a second magnet disposed on the second annular surface such that the first magnet repels the second magnet.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the present disclosure. Exemplary embodiments of components, arrangements, and configurations are described below to simplify the present disclosure; however, these exemplary embodiments are provided merely as examples and are not intended to limit the scope of the present disclosure. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and the claims to refer to particular components. As one skilled in the art will appreciate, various entities may refer to the same component by different names, and as such, the naming convention for the elements described herein is not intended to limit the scope of the present disclosure, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 2:
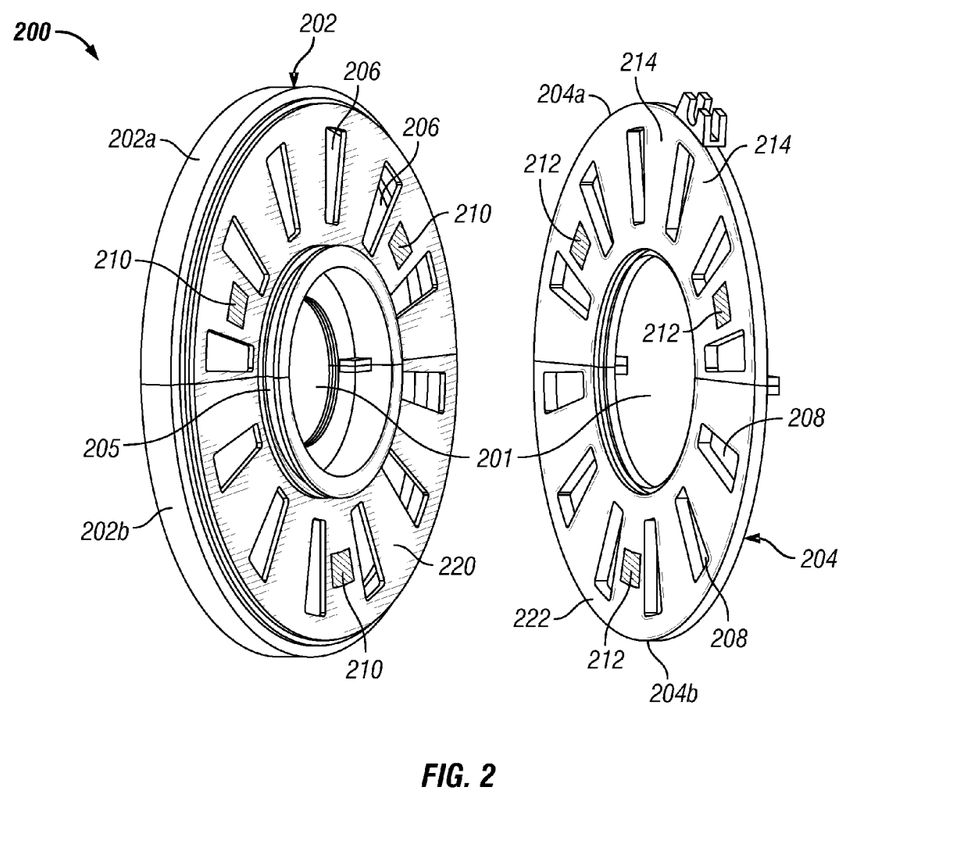
FIG. 2 is a perspective view illustrating magnets disposed on the respective annular mating surfaces of an annular stationary plate and an annular rotatable plate of an annular grid valve, according to example embodiments.

FIG. 2 is a perspective view illustrating one or more magnets 210, 212 disposed on respective annular mating surfaces 220, 222 of an annular stationary plate 202 and an annular rotatable plate 204 of an annular grid valve 200, according to example embodiments. The annular grid valve 200 may be used in place of the conventional annular grid valve 102 in the conventional multi-stage steam turbine 100 disclosed above. As illustrated in FIG. 2, the annular rotatable plate 204 may be disposed on the annular mating surface 220 of the annular stationary plate 202 and may be in contact therewith. Each of the annular stationary plate 202 and the annular rotatable plate 204 (and thus the annular grid valve 200) may define an opening 201 for the rotatable shaft 106 (FIG. 1) to extend therethrough. The annular rotatable plate 204 may rotate relative to the annular stationary plate 202 in an annular guide groove 205 disposed about the opening 201. The annular stationary plate 202 may be a unitary (single, non-divisible) structure or may include two or more segments (202a, 202b) connected with each other via suitable means, e.g., bolts, screws, clips, or the like (not shown). Likewise, the annular rotatable plate 204 may be a unitary (single, non-divisible) structure or may include two or more segments (204a, 204b) connected with each other via suitable means, e.g., bolts, screws, clips, or the like (not shown).

The annular stationary plate 202 may define a plurality of stationary plate holes 206 circumferentially disposed therein. Likewise, the annular rotatable plate 204 may also define a plurality of rotatable plate holes 208 circumferentially disposed therein. The size and shape of the stationary plate holes 206 and the rotatable plate holes 208 may be the same. The stationary plate holes 206 and the rotatable plate holes 208 may be through holes uniformly disposed (e.g., spacing between adjacent holes is the same) on the respective annular mating surfaces 220, 222. The annular grid valve 200 may be "opened" by actuating, e.g., rotating, at least partially, the annular rotatable plate 204 such that the stationary plate holes 206 and the rotatable plate holes 208 at least partially overlap each other to create a passageway for steam to pass through the annular grid valve 200. When the stationary plate holes 206 and the rotatable plate holes 208 overlap, steam may pass axially through the stationary plate holes 206 and the rotatable plate holes 208 from the upstream high pressure stage 116 (FIG. 1) to the downstream low pressure stage 118 (FIG. 1). Similarly, the annular grid valve 200 may be "closed" by rotating the annular rotatable plate 204 such that the stationary plate holes 206 may be completely covered by the annular rotatable plate 204, e.g., by portions 214 of the annular rotatable plate 204 between adjacent rotatable plate holes 208. When closed, steam may be prevented from passing to the downstream low pressure stage 118 (FIG. 1).

The annular mating surface 220 of the annular stationary plate 202 may face the annular mating surface 222 of the annular rotatable plate 204 when the annular rotatable plate 204 is disposed on the annular stationary plate 202. The annular mating surfaces 220, 222 may contact (e.g., entirely) each other when the annular rotatable plate 204 is disposed on the annular stationary plate 202. As illustrated, the one or more magnets 210 may be disposed in the annular mating surface 220. Similarly, the one or more magnets 212 may be disposed in the annular mating surface 222. Each of the magnets 210 and 212 may be disposed in a cavity (not shown) in the respective annular mating surfaces 220 and 222, and may be separated by a small axial gap when the annular rotatable plate 204 is mounted on the annular stationary plate 202. The magnets 210 and 212 may have the same polarities and may be disposed such that the magnets 210 and 212 may repel each other. In an example embodiment, the size and shape of the magnets 210, 212 may be the same. In another example embodiment, the size and shape of the magnets 210, 212 may differ.

The repelling of the magnets 210, 212 may counteract the force acting on the annular mating surfaces 220 and 222 due to the differential pressure across the annular grid valve 200 and/or annular rotatable plate 204 surface area exposed to the steam. As a result, the force acting on the annular mating surfaces 220 and 222 may be reduced. For instance, a contact friction between the annular stationary plate 202 and the annular rotatable plate 204 may be reduced due to the reduced force acting on the annular mating surfaces 220 and 222. Due to the reduced force, a reduced actuating force may be utilized to rotate the annular rotatable plate 204, which, in turn, may utilize an actuating mechanism (FIG. 4) providing a relatively smaller output force. An actuating mechanism providing a relatively smaller output force may be overall smaller in size as compared to an actuating mechanism used in the absence of magnets 210, 212. An overall smaller actuating mechanism may occupy a relatively smaller area (e.g., footprint) resulting in a saving of space.

Although FIG. 2 illustrates three magnets 210, 212 on each annular plate 202, 204, it will be understood that any number of magnets may be used without departing from the scope of the present disclosure. The plurality of magnets 210, 212 may be permanent magnets or electromagnets having a variable magnetic field and/or polarity. Alternatively, some of the magnets 210, 212 may be permanent magnets and the remaining magnets 210, 212 may be electromagnets. According to example embodiments, the number of stationary plate holes 206 (12 in this case) on the annular stationary plate 202 may be the same as the number of the rotatable plate holes 208 on the annular rotatable plate 204. Alternatively, the number of stationary plate holes 206 may be different from the number of the rotatable plate holes 208. According to example embodiments, the size (a radial extent and a circumferential extent) and shape (generally trapezoidal, in this case) of the stationary plate holes 206 on annular stationary plate 202 may be the same as the size and shape of the rotatable plate holes 208 on the annular rotatable plate 204. Alternatively, the size and shape of the stationary plate holes 206 may be different from the size and shape of the rotatable plate holes 208.

Figure 3:
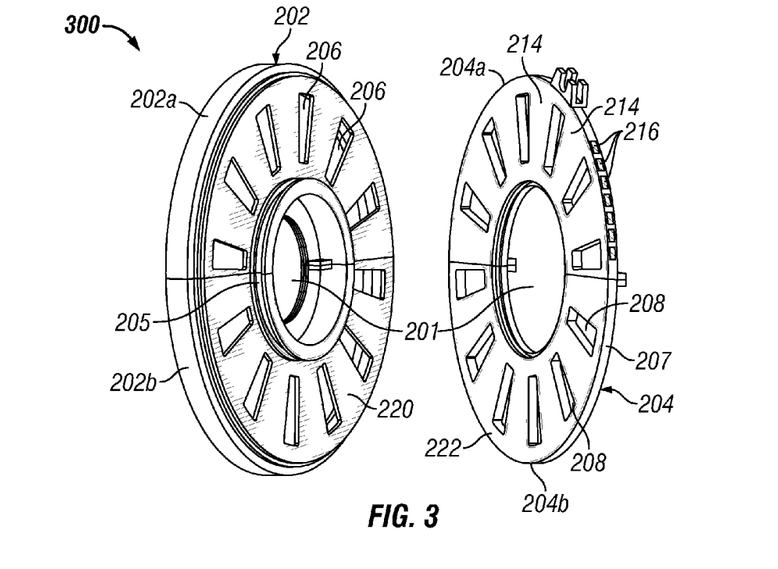
FIG. 3 is a perspective view illustrating magnets disposed on a circumferential edge of an annular rotatable plate of an annular grid valve, according to example embodiments.
Figure 4:
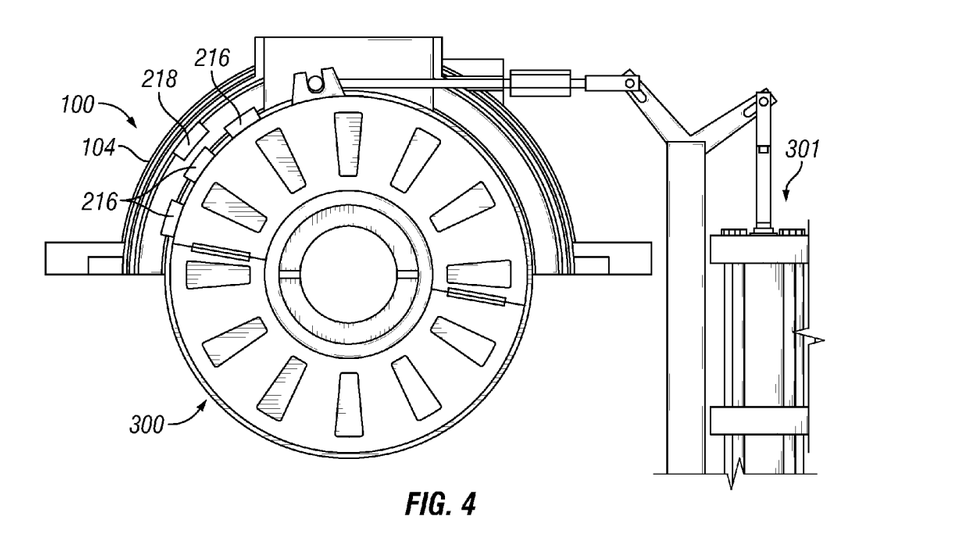
FIG. 4 illustrates a portion of the casing of the conventional steam turbine of FIG. 1 including the annular grid valve of FIG. 3 and one or more magnets disposed in the casing, according to example embodiments.

FIG. 3 is a perspective view illustrating one or more magnets 216 disposed on a circumferential edge 207 of the annular rotatable plate 204 of an annular grid valve 300, according to example embodiments. FIG. 4 illustrates a portion of the casing 104 of the conventional multi-stage steam turbine 100 including the annular grid valve of FIG. 3 and one or more magnets 218 disposed in the casing 104, according to example embodiments. The annular grid valve 300 may be similar in some respects to the annular grid valve 200 described above and therefore may be best understood with reference to the description of FIG. 2 where like numerals designate like components and will not be described again in detail. Referring to FIGS. 3 and 4, one or more magnets 216 may be disposed along the circumferential edge 207 of the annular rotatable plate 204. Additionally, one or more magnets 218 (only one of which is shown) may be disposed in the casing 104 of the steam turbine 100 of FIG. 1 and may be radially spaced from the one or more magnets 216. The magnets 216, 218 may be electromagnets and the magnetic field strength and/or polarity of the magnets 216, 218 may be individually controlled. In other examples, the magnets 216, 218 may be permanent magnets.

The magnetic fields (strength and/or polarity) may be controlled such that varying the magnetic fields may generate a magnetic torque that may rotate the annular rotatable plate 204. For instance, the one or more magnets 216 may be permanent magnets and the magnets 216 may be subjected to a magnetic field from the one or more electromagnets 218. By continuously switching the electric current through the one or more electromagnets 218, the polarity of the magnetic fields of the one or more electromagnets 218 may be reversed and like poles may be generated adjacent the annular rotatable plate 204. The resultant torque may be transferred to the annular rotatable plate 204, thereby rotating the annular rotatable plate 204. The rotational motion due to the magnets 216, 218 may augment the rotating force provided by the actuating mechanism, generally indicated by the reference numeral 301, coupled to the annular rotatable plate 204. As a result, an actuating mechanism that may provide a reduced output force (for example, a reduced rotating force relative to the rotating force in the absence of magnets 216, 218) may be used to rotate the annular rotatable plate 204. As mentioned above, an actuating mechanism providing a reduced actuating force may be overall smaller in size as compared to an actuating mechanism used in the absence of magnets 216, 218. An overall smaller actuating mechanism may occupy a relatively smaller area (e.g., footprint) resulting in a saving of space. In one or more example embodiments, the resultant torque that may be transferred to the annular rotatable plate 204 may be large enough such that an actuating mechanism may not be used to rotate the annular rotatable plate 204.

In another example embodiment, instead of being disposed in the casing 104, the one or more magnets 218 may be disposed (not shown) on a circumferential edge of the annular stationary plate 202. The magnets 216, 218 may be axially spaced from each other and may be disposed such that the magnetic fields of the magnets 216, 218 may interact with each other. Herein, the magnets 216 may be permanent magnets and may be subjected to a magnetic field from the magnets 218, which may be electromagnets. The annular rotatable plate 204 may thus be rotated by varying the magnetic fields, as described above.

Figure 5:
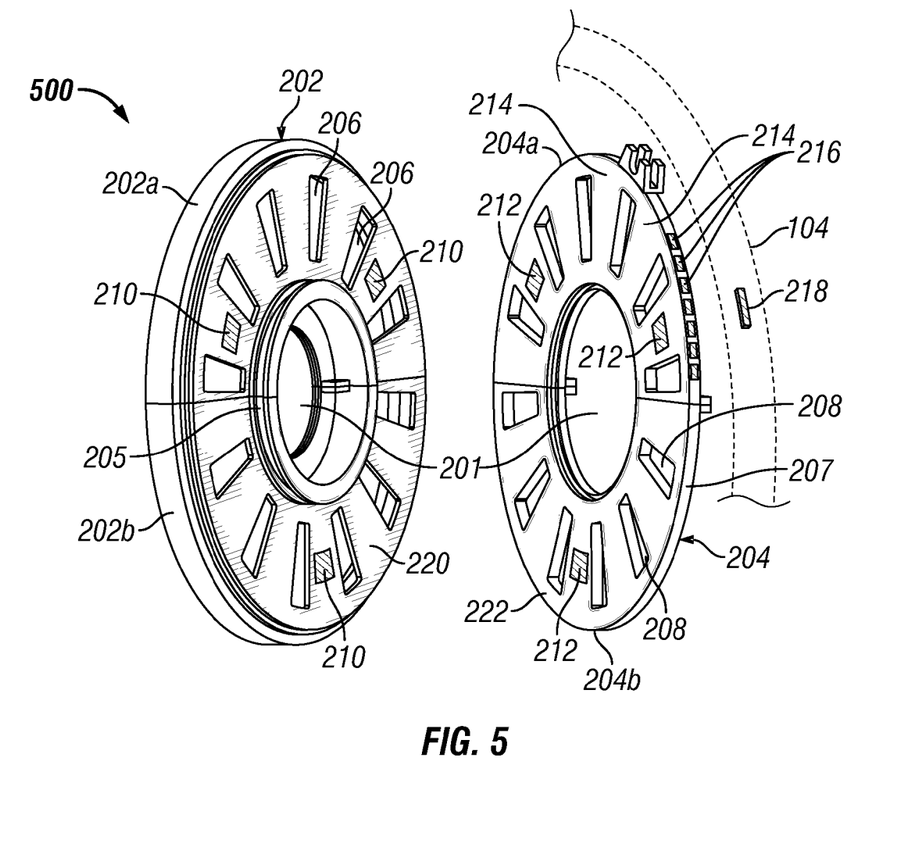
FIG. 5 is a perspective view illustrating magnets disposed on the respective annular mating surfaces of an annular stationary plate and an annular rotatable plate of an annular grid valve and on a circumferential edge of the annular rotatable plate of the annular grid valve, according to example embodiments.

FIG. 5 is a perspective view illustrating the one or more magnets 210, 212 disposed on the respective annular mating surfaces 220, 222 of the annular stationary plate 202 and the annular rotatable plate 204 of an annular grid valve 500 and on the circumferential edge 207 of the annular rotatable plate 204 of the annular grid valve 500, according to example embodiments. The annular grid valve 500 may be similar in some respects to the annular grid valves 200 and 300 described above and therefore may be best understood with reference to the description of FIGS. 2 and 3 where like numerals designate like components and will not be described again in detail. Referring to FIG. 5, the one or more magnets 216 disposed on the circumferential edge 207 and the one or more magnets 218 (only one shown) disposed in the casing 104 (illustrated in phantom) may be present in addition to the magnets 210, 212. As mentioned above, the magnets 210, 212 may repel each other, and this combined with the rotational motion created by the magnets 216, 218 may further augment the rotating force provided by the actuating mechanism. As a result, the rotating force generated by the actuating mechanism may be further reduced. It should be noted that the radial distance between the magnets 216, 218 (and, in effect, the radial distance between the casing 104 and the annular rotatable plate 204) has been exaggerated in FIG. 5 for the sake of clarity and may be such that the magnetic fields of the magnets 216, 218 may interact to cause the rotational motion of the annular rotatable plate 204.

It will be understood that the location of the magnets 210 and 212 may not be restricted to the location illustrated in FIGS. 2 and 5 and may be varied without departing from the scope of the present disclosure. For example, the magnets 210 and 212 may be placed on the respective non-mating annular surfaces of the respective annular plates 202 and 204. In this case, although the magnets 210 and 212 may not face each other, the magnetic fields of the magnets 210 and 212 may be configured such that the magnetic fields may interact with each other, e.g., through the respective annular plates 202, 204, such that the magnets 210 and 212 repel each other. Also, it will be understood that the location of the magnets 216 and 218 may not be restricted to the location illustrated in FIGS. 3-5 and the location thereof may be varied without departing from the scope of the present disclosure. It will also be understood that the actuating mechanism 301 (FIG. 4) may be used to actuate the annular grid valves 200, 500, and 600 (FIG. 6, see below) without departing from the scope of the present disclosure.

Figure 6:
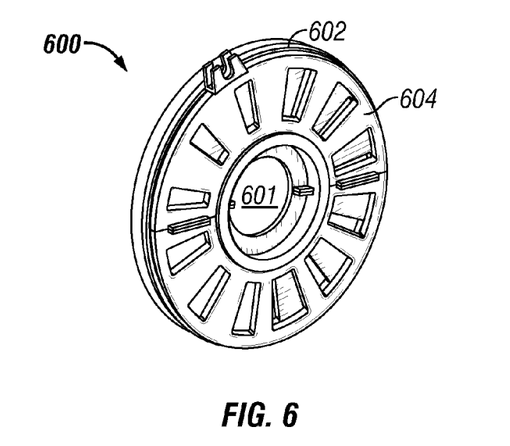
FIG. 6 illustrates a perspective view of another annular grid valve, according to example embodiments.
Figure 7:
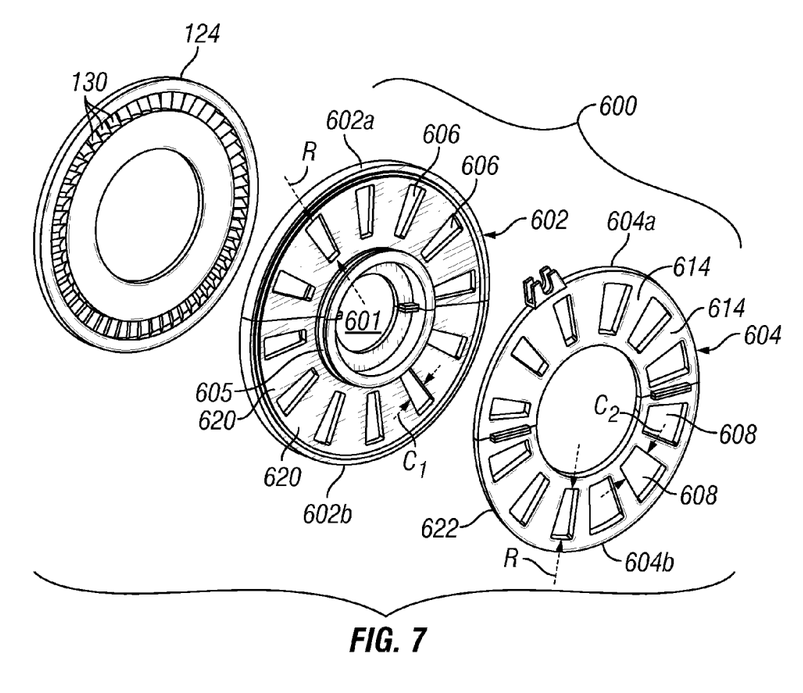
FIG. 7 is an exploded view illustrating the annular grid valve of FIG. 6 and the annular nozzle plate of FIG. 1, according to example embodiments.
Figure 8:
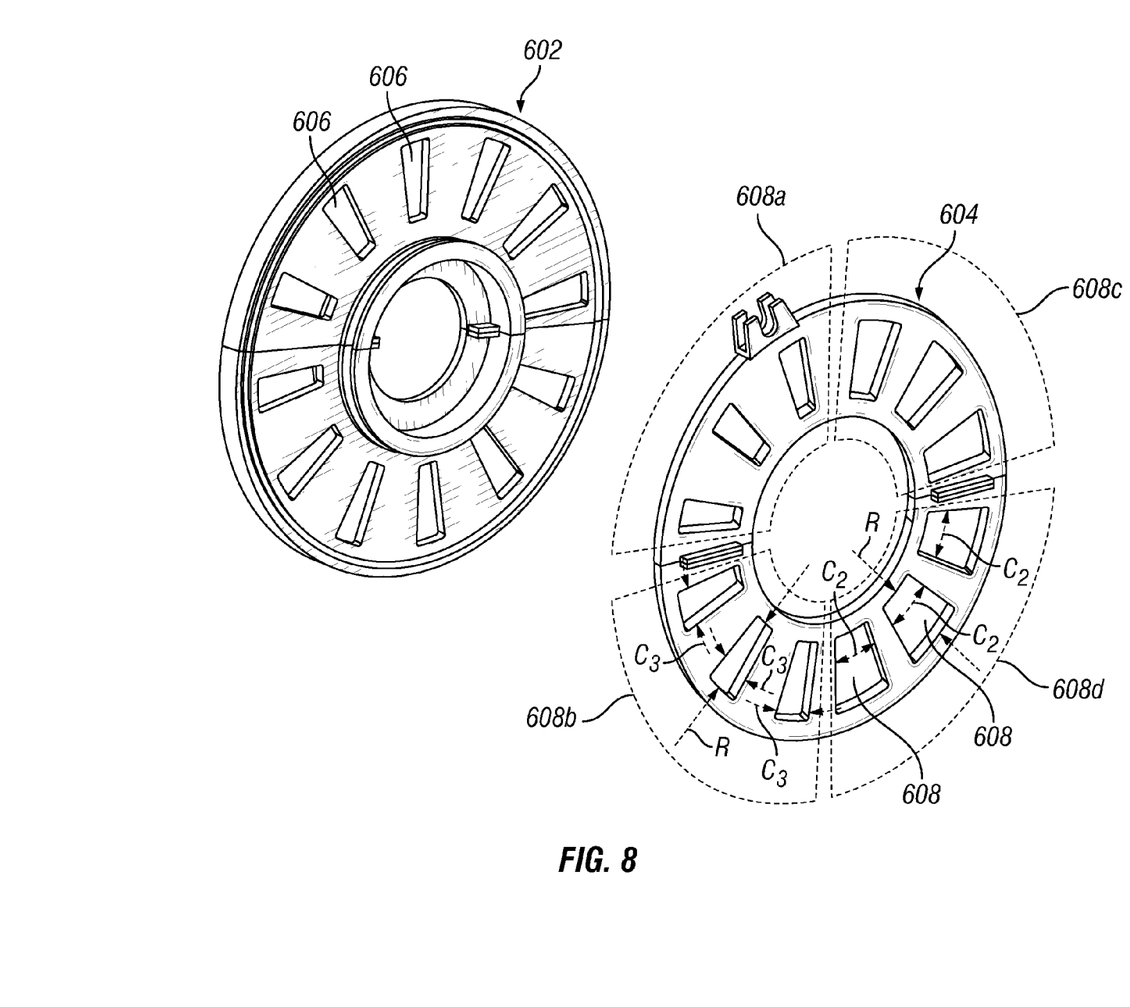
FIG. 8 is another exploded view of the annular grid valve of FIGS. 6 and 7 showing the different sets of holes, according to example embodiments.

FIG. 6 illustrates a perspective view of another annular grid valve 600, according to example embodiments. FIG. 7 is an exploded view illustrating the annular grid valve 600 and the annular nozzle plate 124 of FIG. 1, according to example embodiments. FIG. 8 is another exploded view of the annular grid valve 600 showing the different hole sets 608a, 608b, 608c, and 608d, according to example embodiments. The annular grid valve 600 may be used in place of the conventional annular grid valve 102 in the conventional multi-stage steam turbine 100 disclosed above. Referring to FIGS. 6 and 7, the grid valve 600 may include an annular stationary plate 602 and an annular rotatable plate 604 disposed on and in contact with an annular mating surface 620 of the annular stationary plate 602. The annular rotatable plate 604 may rotate relative to the annular stationary plate 602 in an annular guide groove 605 in the annular stationary plate 602. Each of the annular stationary plate 602 and the annular rotatable plate 604 (and thus the annular grid valve 600) may define an opening 601 for the rotatable shaft 106 (FIG. 1) to extend therethrough. The annular stationary plate 602 may be a unitary (single, non-divisible) structure or may be manufactured as two or more segments (602a, 602b) connected with each other using suitable means, e.g., bolts, screws, clips, or the like (not shown). Likewise, the annular rotatable plate 604 may be a unitary (single, non-divisible) structure or may be manufactured as two or more segments (604a, 604b) connected with each other using suitable means, e.g., bolts, screws, clips, or the like (not shown).

The annular stationary plate 602 may define a plurality of stationary plate holes 606 circumferentially disposed therein. The plurality of stationary plate holes 606 may be through holes and the annular stationary plate 602 is illustrated as having a total of 12 stationary plate holes 606 uniformly disposed (e.g., spacing between adjacent stationary plate holes 606 is the same) on the annular stationary plate 602. The size and shape of each of the stationary plate holes 606 may be the same. For example, as shown in FIGS. 7 and 8, each stationary plate hole 606 may be generally trapezoidal in shape and may have the same radial extent (R) and same circumferential extent ($C_1$). The circumferential extent ($C_1$, and the below-mentioned $C_2$ and $C_3$) of each hole in the annular plates 602, 604 may be measured at the same radial distance from the center of the respective annular plates 602, 604.

The annular rotatable plate 604 may also define a plurality of rotatable plate holes 608 circumferentially disposed therein. The plurality of rotatable plate holes 608 may also be through holes and the number of rotatable plate holes 608 may be the same (12, as illustrated in FIGS. 7 and 8) as the number of stationary plate holes 606 in the annular stationary plate 602. Also, the general shape (trapezoidal, as illustrated in FIGS. 7 and 8) and the radial extent (R) of the rotatable plate holes 608 may be the same as the shape and radial extent (R) of the stationary plate holes 606 in the annular stationary plate 602. However, the circumferential extent of one or more of the rotatable plate holes 608 may be different from the circumferential extent of the stationary plate holes 606, and the rotatable plate holes 608 may be arranged into two or more sets based on the circumferential extent. For instance, as illustrated in FIG. 7, a circumferential extent ($C_1$) of the stationary plate holes 606 may be different from a circumferential extent ($C_2$) of the rotatable plate holes 608.

As illustrated in FIG. 8, the plurality of rotatable plate holes 608 may be arranged in four sets 608a, 608b, 608c, and 608d. Each rotatable plate hole 608 of the plurality of rotatable plate holes 608 may have the same general shape (trapezoidal) and may have the same radial extent (R). Also, the circumferential extent of all rotatable plate holes 608 in a set may be the same. However, the circumferential extent of the rotatable plate holes 608 between different sets may be different. For instance, as illustrated in FIG. 8, all rotatable plate holes 608 in the set 608d may have the same circumferential extent $C_2$. Likewise, all rotatable plate holes 608 in the set 608b may have the same circumferential extent $C_3$. However, the circumferential extent $C_2$ may be different from the circumferential extent $C_3$. For example, the holes in the set 608a may have the smallest circumferential extent and the holes in the set 608d may have the largest circumferential extent. In an example embodiment, the circumferential extent of the rotatable plate holes 608 may increase, e.g., incrementally or by a fixed ratio, between sets.

Returning to FIG. 7, the respective annular mating surfaces 620, 622 of the annular stationary plate 602 and the annular rotatable plate 604 may contact (e.g., in their entirety) each other when the annular grid valve 600 may be assembled. In an example embodiment, the plurality of rotatable plate holes 608 may be arranged such that portions 614 of the annular rotatable plate 604 between immediately adjacent rotatable plate holes 608 may be large enough to completely overlap/cover the stationary plate holes 606 in the annular stationary plate 602.

Hereafter, the operation of the annular grid valve 600 will be described, according to one or more example embodiments. Initially, the annular rotating plate 604 may be disposed such that all the stationary plate holes 606 in the annular stationary plate 602 may be completely misaligned with the rotatable plate holes 608 in the annular rotatable plate 604. Stated otherwise, portions 614 of the annular rotatable plate 604 may wholly overlap all stationary plate holes 606. As a result, steam may be prevented from passing to the downstream stage 118 and the grid valve may be referred to as being in a first position (completely closed).

In order to open the grid valve 600, the annular rotatable plate 604 may be rotated such that the rotatable plate holes 608 in the annular rotatable plate 604 sequentially overlap with one or more groups of the stationary plate holes 606 in the annular stationary plate 602. The stationary plate holes 606 in one group may be different from the stationary plate holes 606 in another group. In other words, the groups of stationary plate holes 606 may be disjoint (having no holes in common). In an example embodiment, the holes in the sets 608a, 608b, 608c, and 608d may overlap with the one or more groups of the stationary plate holes 606 in a desired or predetermined sequence, starting with the rotatable plate holes 608 in the set 608b and then continuing with holes in the sets 608a, 608c, and 608d (in that order). Once all rotatable plate holes 608 in the set 608d have wholly overlapped stationary plate holes 606, all rotatable plate holes 608 in the sets 608a, 608b, and 608c may also be wholly overlapped with stationary plate holes 606 and the grid valve 600 may be referred to as being in a second position (completely open). At any intermittent position between the first position and the second position, the grid valve may be considered as partially open, wherein some of the rotatable plate holes 608 of the sets 608a, 608b, 608c, and 608d may partially or wholly overlap stationary plate holes 606 while the remaining rotatable plate holes 608 may be completely covered by portions 614.

In order to close the grid valve 600 from the second position, the annular rotatable plate 604 may be rotated in an opposite direction (relative to the direction of rotation when opening the grid valve) and the rotatable plate holes 608 may sequentially misalign with the one or more groups of stationary plate holes 606. As mentioned above, the stationary plate holes 606 in one group may be different from the stationary plate holes 606 in another group. In other words, the groups of stationary plate holes 606 may be disjoint (having no holes in common). For example, as the annular rotatable plate 604 rotates, the rotatable plate holes 608 of the set 608d may sequentially misalign (covered by portions 614) with the one or more groups of stationary plate holes 606. The annular rotatable plate 604 may be rotated further and the rotatable plate holes 608 of the sets 608c, 608a, and 608b (in that order) may sequentially misalign with the remaining groups of stationary plate holes 606 of the annular stationary plate 602. Once the rotatable plate holes 608 in the set 608b have completely misaligned with all the stationary plate holes 606, the grid valve 600 may be in the first position and all stationary plate holes 606 may be covered by the portions 614 of the annular rotatable plate 604.

The above-mentioned sequential opening and closing of the grid valve 600 may prevent steam from passing through the nozzles 130 of the annular nozzles plate 124 at the same time. For instance, when opening the grid valve 600, the nozzles 130 directly behind the rotatable plate holes 608 in the set 608b may initially receive steam followed by nozzles 130 directly behind rotatable plate holes 608 in the sets 608a, 608c, and 608d (in that order). Likewise, when closing the grid valve 600, the nozzles 130 directly behind the rotatable plate holes 608 in the set 608d may stop receiving steam followed by the nozzles 130 directly behind the rotatable plate holes 608 in the sets 608c, 608a, and 608b (in that order). As such, steam may be provided to the downstream stages sequentially through the nozzles 130, thereby reducing the throttling effect on the downstream stages and increasing steam turbine efficiency. It should be noted that the above mentioned order of opening and closing the rotatable plate holes 608 is merely an example and the order may be varied without departing from the scope of the present disclosure.

It will be understood that the grid valve 600 may not always be operated between the completely closed position (first position) and the completely open position (second position), and intermediate operating positions are also within the scope of this disclosure. It will also be understood that the above-mentioned sequence of overlapping and/or misaligning the rotatable plate holes 608 with the stationary plate holes 606 is merely an example and any desired sequence that may provide steam to the downstream stages sequentially through the nozzles 130 is within the scope of this disclosure. Further, it should be noted that the annular rotatable plates 204 and 704 may not be rotated 360°, but the actuating mechanism may move the annular rotatable plates 204 and 704 back and forth such that the annular rotatable plates 204 and 704 may traverse an arc of varying degrees measured at the center of the respective annular grid valves.

According to example embodiments, the grid valve 600 may also include the plurality of magnets 210, 212 (FIGS. 2 and 5) disposed in the annular mating surfaces 620 and 622, respectively. Additionally or alternatively, the grid valve 600 may include magnets 216, 218 (FIGS. 3-5) disposed on a circumferential edge of the annular rotating plate 604 and in a casing containing the grid valve 600, respectively.

It will be understood that, although the annular stationary plate 602 has been illustrated as having 12 stationary plate holes 606 and the annular rotatable plate 604 has been illustrated as having 12 rotatable plate holes 608, the number of stationary plate holes 606 and rotatable plate holes 608 may be increased or decreased without departing from the scope of the present disclosure. Further, the shape (trapezoidal) and the size (radial and circumferential extents) of the stationary plate holes 606 and rotatable plate holes 608 disclosed above is merely an example and may be varied without departing from the scope of the present disclosure.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

We claim:

1. A grid valve, comprising:
   an annular stationary plate having a first annular surface;
   an annular rotatable plate disposed on the annular stationary plate and rotatable relative to the annular stationary plate, the annular rotatable plate having a second annular surface contacting the first annular surface, and each of the annular stationary plate and the annular rotatable plate defining a plurality of holes in the respective annular surfaces thereof;
   a first magnet disposed on the first annular surface; and
   a second magnet disposed on the second annular surface such that the first magnet repels the second magnet.

2. The grid valve of claim 1, wherein the first magnet and the second magnet are axially spaced from each other.

3. The grid valve of claim 1, wherein the first magnet and the second magnet are permanent magnets.

4. The grid valve of claim 1, wherein the first magnet and the second magnet are electromagnets.

5. The grid valve of claim 1, wherein the first magnet is disposed between the plurality of holes on the first annular surface and the second magnet is disposed between the plurality of holes on the second annular surface.

6. The grid valve of claim 1, further comprising:
   a third magnet disposed on a circumferential edge of the annular rotatable plate, a magnetic field of the third magnet configured to interact with an external magnetic field to rotate the annular rotatable plate, the external magnetic field being provided by a fourth magnet radially spaced from the third magnet.

7. The grid valve of claim 1, further comprising:
   a third magnet disposed on a circumferential edge of the annular rotatable plate and a fourth magnet disposed on a circumferential edge of the annular stationary plate, the third and fourth magnets configured to rotate the annular rotatable plate.

8. The grid valve of claim 1, wherein the first magnet and the second magnet are configured to reduce a differential pressure across the grid valve.

9. A grid valve, comprising:
   an annular stationary plate defining a plurality of stationary plate holes circumferentially disposed in a first annular surface thereof, such that the plurality of stationary plate holes encircle an opening defined in the annular stationary plate, the opening configured to receive a rotatable shaft therethrough; and
   an annular rotatable plate disposed on the annular stationary plate and rotatable relative to the annular stationary plate, the annular rotatable plate defining a plurality of rotatable plate holes in a second annular surface thereof contacting the first annular surface, the plurality of rotatable plate holes including a first set of rotatable plate holes and a second set of rotatable plate holes, wherein the first set of rotatable plate holes has a first circumferential extent and the second set of rotatable plate holes has a second circumferential extent different from the first circumferential extent, and
   the annular rotatable plate is configured to permit working fluid to pass through the plurality of stationary plate holes and the plurality of rotatable plate holes in a first predetermined sequence;
   a first magnet disposed on the first annular surface; and
   a second magnet disposed on the second annular surface such that the first magnet repels the second magnet.

10. The grid valve of claim 9, wherein the plurality of stationary plate holes defined on the annular stationary plate have a same circumferential extent.

11. The grid valve of claim 9, wherein the first predetermined sequence comprises:
    at least partially overlapping the first set of rotatable plate holes with a first group of the plurality of stationary plate holes prior to at least partially overlapping the second set of rotatable plate holes with a second group of the plurality of stationary plate holes, wherein the first group of stationary plate holes and the second group of stationary plate holes are disjoint.

12. The grid valve of claim 11, wherein the annular rotatable plate is configured to prevent the working fluid from passing through the plurality of stationary plate holes and the plurality of rotatable plate holes in a second predetermined sequence.

13. The grid valve of claim 12, wherein the second predetermined sequence comprises:
    at least partially blocking the second group of the plurality of stationary plate holes using the annular rotatable plate prior to at least partially blocking the first group of the plurality of stationary plate holes using the annular rotatable plate.

14. A grid valve, comprising:
    an annular stationary plate defining a plurality of stationary plate holes circumferentially disposed in a first annular surface thereof, such that the plurality of stationary plate holes encircle an opening defined in the annular stationary plate, the opening configured to receive a rotatable shaft therethrough;
    an annular rotatable plate disposed on the annular stationary plate and rotatable relative to the annular stationary plate, the annular rotatable plate defining a plurality of rotatable plate holes on a second annular surface thereof, the plurality of rotatable plate holes including a first set of rotatable plate holes and a second set of rotatable plate holes, wherein
  the first set of rotatable plate holes has a first circumferential extent and the second set of rotatable plate holes has a second circumferential extent different from the first circumferential extent, and
  the annular rotatable plate is configured to permit working fluid to axially pass through a first group of the plurality of stationary plate holes and a second group of the plurality of stationary plate holes in a first predetermined sequence;
a first magnet disposed on the first annular surface; and
a second magnet disposed on the second annular surface such that the first magnet repels the second magnet.

15. The grid valve of claim 14, wherein the first annular surface and the second annular surface contact each other and the first magnet and the second magnet are axially spaced from each other.

16. The grid valve of claim 14, further comprising:
a third magnet disposed on a circumferential edge of the annular rotatable plate, a magnetic field of the third magnet configured to rotate the annular rotatable plate via interaction with a magnetic field of a fourth magnet radially spaced from the third magnet.

17. The grid valve of claim 14, further comprising:
a third magnet disposed on a circumferential edge of the annular rotatable plate and a fourth magnet disposed on a circumferential edge of the annular stationary plate, the third and fourth magnets configured to rotate the annular rotatable plate.

18. The grid valve of claim 14, wherein the first predetermined sequence comprises:
at least partially overlapping the first set of rotatable plate holes with the first group of the plurality of stationary plate holes prior to at least partially overlapping the second set of rotatable plate holes with the second group of the plurality of stationary plate holes.

19. The grid valve of claim 18, wherein the annular rotatable plate is configured to prevent the working fluid from passing through the first group of the plurality of stationary plate holes and the second group of the plurality of stationary plate holes in a second predetermined sequence.

20. The grid valve of claim 19, wherein the second predetermined sequence comprises:
at least partially blocking the second group of the plurality of stationary plate holes using the annular rotatable plate prior to at least partially blocking the first group of the plurality of stationary plate holes using the annular rotatable plate.

* * * * *